Dec. 25, 1962    R. B. SPOONER    3,070,535
NUCLEAR REACTOR SAFETY DEVICE
Filed Jan. 21, 1959    2 Sheets-Sheet 1

INVENTOR.
ROBERT B. SPOONER.
BY
C. Daniel Cornish
HIS ATTORNEY.

Dec. 25, 1962   R. B. SPOONER   3,070,535
NUCLEAR REACTOR SAFETY DEVICE
Filed Jan. 21, 1959   2 Sheets-Sheet 2

INVENTOR.
ROBERT B. SPOONER.
BY C. Daniel Cornish.
his ATTORNEY.

United States Patent Office 3,070,535
Patented Dec. 25, 1962

3,070,535
NUCLEAR REACTOR SAFETY DEVICE
Robert B. Spooner, Pittsburgh, Pa., assignor to Koppers Company, Inc., a corporation of Delaware
Filed Jan. 21, 1959, Ser. No. 788,130
1 Claim. (Cl. 204—193.2)

This invention relates generally to nuclear reactors and more particularly to a safety device for nuclear reactors.

Recently new nuclear fuel material combinations and configurations have been proposed for commercially feasible high temperature nuclear reactors in an effort to find the most efficient and economical fuel therefor. Such fuels, for example, have been those disclosed in my co-pending U.S. patent application Serial No. 775,072 (now abandoned) filed November 19, 1958 and entitled, "Fuel Element For a Gas Cooled Nuclear Reactor." It would have been time-consuming and expensive to determine the most efficient and economical fuels by testing the proposed fuels in commercial reactors. Consequently high temperature small scale test reactors have been required for testing such new fuels prior to their use in commercial reactors.

Generally such test reactors contain within a pressure tight outer shell a low temperature section adjacent the outer shell and a high temperature test section contained in an inner shell at the center of the reactor. The low tempertaure section has conventional control rods which are set so that each section produces the amount of heat desired and each section contains heat transfer means which carry away desired amounts of heat so that each section operates at a desired temperature.

These heat transfer mediums may be, for example, liquid such as water in the low temperature section and gas such as air in the high temperature section.

In nuclear reactors such as described in my mentioned co-pending application even after the control rods are set for a desired reactor heat output there are normally power transients so that from time to time the temperature of the reactor fuel elements will increase and decrease from the desired levels. In the case of test reactors the power transients in the low temperature section are usually not harmful to the elements of the low temperature section because the temperature increase therein can be sensed and the flow of heat transfer medium can be increased or the reactor can be shut down in time to prevent damage from overheating. The temperature of the high temperature section, however, may be so high that slight increases in temperature cannot be controlled adequately and may be destructive to the high temperature section and its shell. For example, an increase in temperature may be higher than expected and may come about quite rapidly in the high temperature section so that conventional thermocouples for sensing the temperature change and mechanisms responsive thereto for increasing the flow of heat transfer medium or for raising and lowering the control rods to shut the reactor down are not able to respond rapidly enough. Thus high temperatures from the high temperature section may melt the shell around the high temperature section before preventive steps can be taken. Also, if test fuels in the high temperature section are allowed to heat themselves to destruction, as may be required, the heat in the high temperature section may be so great that this heat may be conducted to the low temperature fuel element assembly thereby damage the latter and conducted to the outer reactor shell whereby the latter is ruptured. Damage to the low temperature fuel elements is disadvantageous because these fuel elements are quite expensive. Rupture of the outer shell is disadvatageous because such a rupture can cause serious danger to operating personnel whereby large amounts of dangerous nuclear reaction products, which may be accumulated to very high concentrations in the low temperature section, can become volatile and be released suddenly through a rupture in the outer shell wall.

Attempts have been made to insulate the high temperature fuel elements to overcome the above described problems but these have been inadequate or impractical because these attempts have not given a great enough time delay to sense dangerously high temperatures and to take steps, either manually or automatically, during such time to prevent the described adverse effects of overheating. As a result, it was necessary heretofore to operate the reactors at lower temperatures than desired.

This invention provides a safety device which will increase the time within which a reactor can be shut down before damage from overheating occurs to the shell of the high temperature section or any portion of the low temperature section of the reactor and thus allows reactors to be operated at higher temperatures than were possible or feasible heretofore.

This invention contemplates interposing between a high temperature fuel element assembly and portions of a nuclear reactor which are to be protected, a material which by undergoing an endothermic reaction absorbs large amounts of heat thereby tending to prevent damage to the portions of the reactor to be protected when the high temperature fuel element assembly overheats.

The above and further objects and novel features of the invention will appear more fully from the following detailed description when the same is read in connection with the accompanying drawing. It is to be expressly understood, however, that the drawing is not intended to be a definition of the invention but is for the purpose of illustration only.

Figure 1:
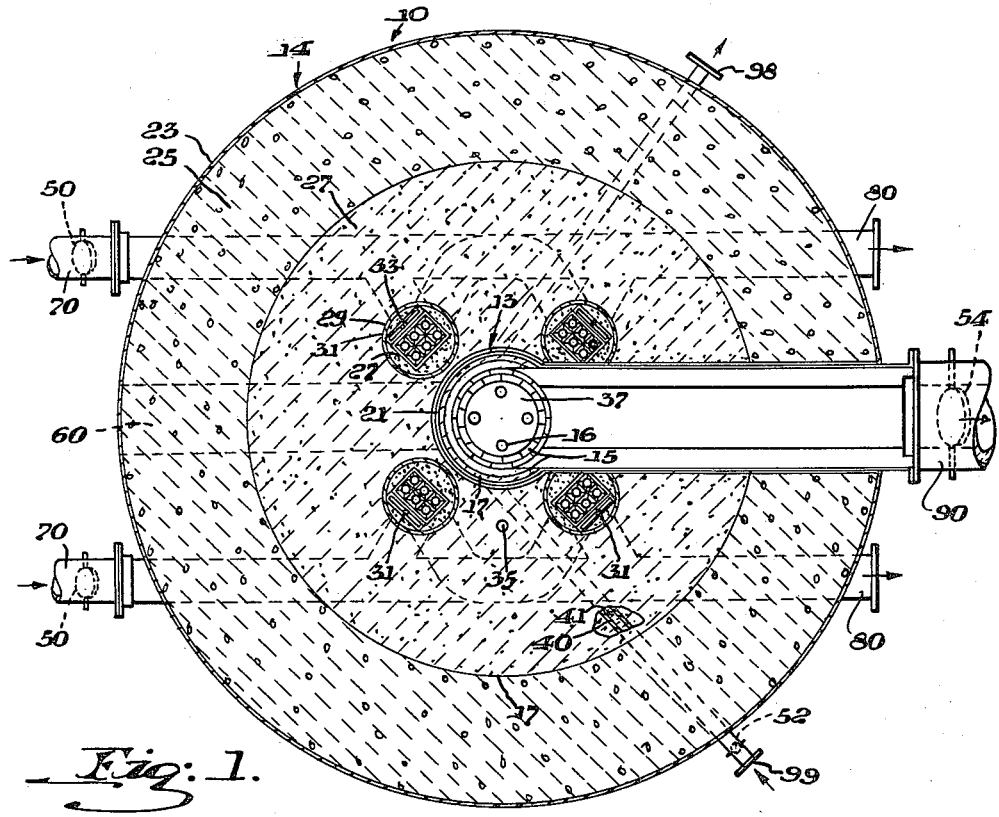
FIG. 1 is a partial cross section of a nuclear reactor having a high temperature section, a low temperature section and one embodiment of this invention.

Referring to FIG. 1, one embodiment of a test reactor 10 is shown with a high temperature section 13 surrounded by a low temperature section 14 which together comprise a "critical" amount of uranium or uranium compounds; advantageously, however, most of the uranium is in the low temperature section. The high temperature section is contained with a removable inner shell 21 and the low temperature section is contained within an outer shell 23. Immediately adjacent the outer shell 23 a layer 25 of borated graphite acts to absorb and shield neutrons and thus together with shell 23, which is advantageously stainless steel, prevents the escape of neutrons to the exterior of the reactor 10. Adjacent the inside of layer 25 is a conventional layer 27 of high density graphite or berllium oxide which acts as a neutron moderator in which low temperature fuel element assemblies 29 are located.

These low temperature assemblies 29 are conventionally contained within an aluminum shell 31 filled with moderator 27 such as high density graphite in which conventional boxed type fuel plates (not shown) are located. Control rods 33, which are also conventional, and made for example with steel containing boron, are located adjacent these fuel plates. When these control rods are raised the temperature of the reactor fuel decreases and when these control plates are lowered the temperature of the reactor fuel increases. Conventional valve 50 in conduit 70 controls the amount of cooling fluid flow to assemblies 29 and conventional heat exchange means (not shown) connected between outlet 80 and inlet 70 maintain this cooling fluid at a desired temperature.

A conventional initial neutron source 35 is provided between adjacent fuel assemblies so that when raised into position a nuclear reaction is initiated such as is well known and such as is described in my mentioned co-pending application, Serial No. 775,072, now abandoned.

Figure 2:
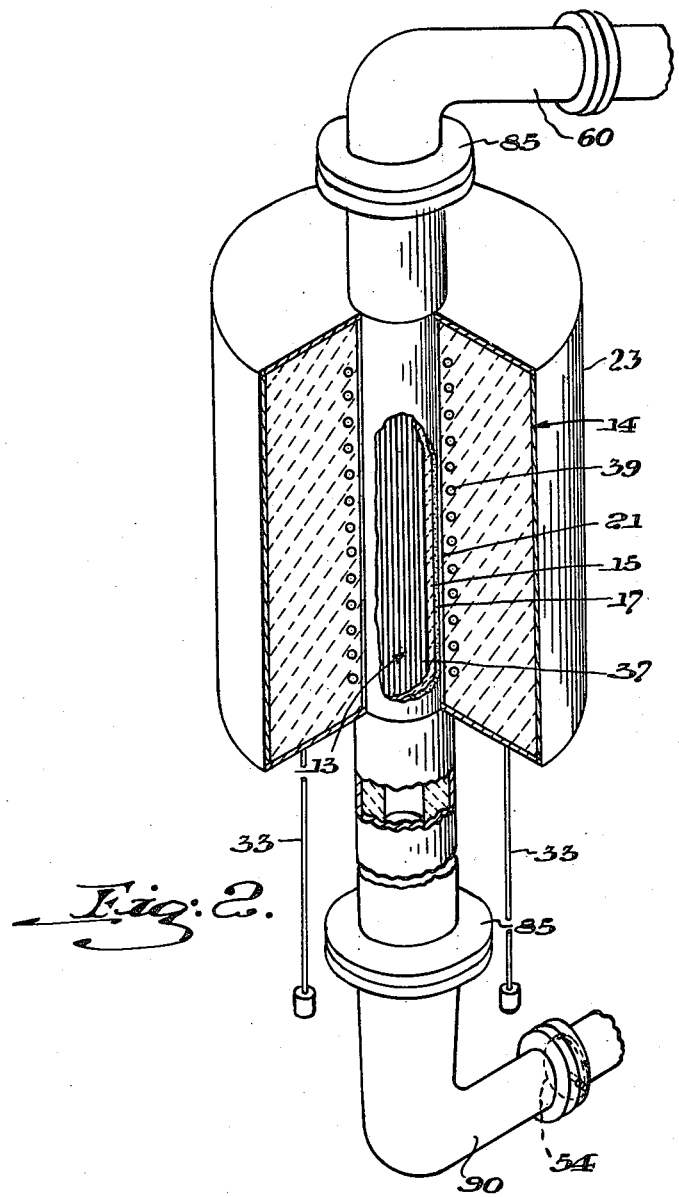
FIG. 2 is a partial isometric and cross section which schematically illustrates the reactor of FIG. 1.

This co-pending application also describes novel gas cooled fuel element assemblies. The fuel element assemblies described therein particularly with reference to FIG. 2, are adapted for use as the high temperature fuel assemblies 16 of the test reactor described herein. These fuel assemblies 16 are surrounded by moderator 37 similar to moderator 27 and valve 54 controls the amount of flow of heat transfer medium or cooling gas in said fuel assemblies 16. This cooling gas enters the bottom of the reactor through conduit 90 and leaves at the top through conduit 60 while sweep gas reduces contamination of fission products in this cooling gas as described in my mentioned co-pending application with reference to FIG. 1 therein.

Referring now to FIG. 2, in accordance with this invention, the high temperature section 13 is contained in a shell 21 which is removable by means of conventional flanges 85 which bolt to conventional removable L section conduits lined with high temperature refractory material. In this section 13 an annular layer of insulation 15, which comprises materials such as high temperature resistant refractory material, for example, alumina brick or low density carbon black, surrounds the high temperature moderator 37. Surrounding insulation 15 is an annular safety layer 17 made of material which absorbs heat by undergoing an endothermic reaction. Surrounding safety layer 17 is a shell 21, advantageously made of stainless steel, having surrounding cooling coils 39 which have a suitable cooling fluid 41 therein such as water pumped therethrough from a conventional source such as conduits 40. Conventional valve 52 connected between coils 39 and inlet 99 controls the amount of cooling fluid in coils 39 and a conventional heat exchanger (not shown) between outlet 98 and inlet 99 for cooling fluid 41 maintain cooling fluid 41 at a desired temperature.

The heat absorbing material of safety layer 17 advantageously includes calcium sulfate which above 1300° C. absorbs heat by decomposition so as to produce calcium oxide and sulfur-trioxide. Other materials suitable for this safety layer 17 include magnesium carbonate which decomposes above 500° C., calcium carbonate which decomposes above 700° C., and barium carbonate which decomposes above 1100° C. All these latter materials decompose by endothermic reaction to their respective metal oxide with the release of $CO_2$ gas.

The selection of material for the safety layer is a practical matter depending upon the temperature of the reactor and safety layer under normal operating conditions. The temperature of the safety layer in a reactor under normal operating temperature depends on the temperature drop from the fuel element section 13 to the safety layer 17 due to the conduction characteristics of insulator 15, the safety layer 17 and the temperature of coolant 41. For example, in a reactor normally operating at 1650° C. in its fuel section 13 the insulator 15 has low thermal conductivity and the safety layer 17 has relatively high thermal conductivity. Thus if calcium sulfate is used for the safety layer 17, insulation 15 of adequate thickness and enough flow of coolant 41 are provided so that the normal operating temperature of the inside surface of the safety layer 17 is below the temperature which would cause an endothermic reaction therein or about 1000° C.

If this safety layer 17 be made of calcium sulfate, it is made initially, advantageously by casting in place the calcium sulfate as a water mixture of plaster-of-Paris.

After casting, this plaster-of-Paris is ready for use. The coating is heated to a temperature of 212° F. whereupon the water in the mixture is driven off. The other materials mentioned for the safety layer may be cast in place in like manner.

Normally the reactor fuel section operates at 1650° C. but if this temperature rises the safety layer prevents for a short period of time the excessive heat of the high temperature section 13 from damaging its shell or adjacent low temperature fuel elements and also from rupturing the reactor shell 12.

It is understood that this invention includes using more than one layer of safety material or more than one material for the safety layer or layers 17. Thus the safety factor of the reactor may be increased still further.

Figure 3:
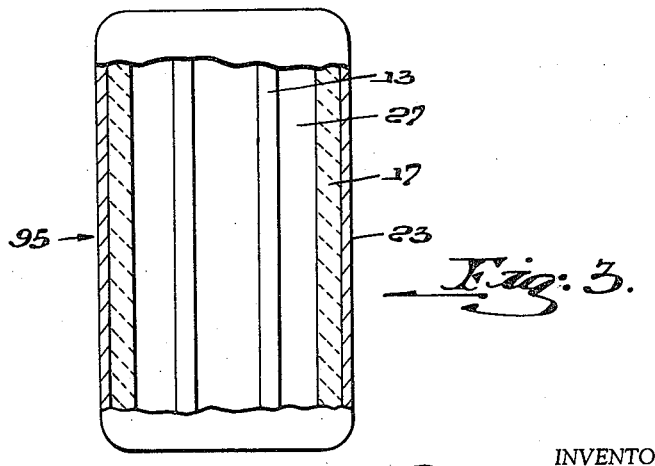
FIG. 3 is a partial cross section and schematic view of another reactor incorporating an embodiment of this invention.

It is also understood that this invention can be incorporated in other forms of reactors or the same kind of reactors described with different forms of fuel elements. For example, another embodiment of this invention comprises incorporating in a commercial reactor as described in my mentioned co-pending application a safety layer 17 interposed between the outer reactor shell and the adjacent moderator material as shown in FIG. 3 herein. This embodiment would help protect the outer shell 23 from rupture due to excessive heat inside reactor 95 by providing a time delay after the reactor temperature becomes dangerously high during which the reactor could be shut down before the outer shell was ruptured. This would also make possible the operation of such reactors at higher temperatures than feasible or possible heretofore.

The foregoing has presented a novel safety device for nuclear reactors which provides a time delay during which the adverse effect of a tendency of the temperature of the heat in the reactor to rise to dangerous levels is minimized because the material of the safety device described uses excessive heat to decompose by an endothermic reaction. Thus the excessive heat which would normally cause the temperature of the reactor to rise is absorbed for a period long enough to permit the reactor to be shut down by raising the control rods into neutron blocking position or for other operating conditions to be adjusted thus to prevent injury to the reactor from the increase in temperature. Also this invention makes possible the testing of a variety of nuclear fuel element materials and configurations in a shell which can be inserted and removed intact from a nuclear reactor.

What is claimed is:

The combination with a high temperature neutronic reactor of the type employing fissionable fuel elements normally operating at about 1650° C., said fuel elements being surrounded in discrete layers by a moderator, a neutron reflector and a heat conducting metal shell having means for circulating cooling fluid therein, of a protection system comprising, a refractory insulator around said moderator, a safety layer interposed between said shell and said refractory insulator, said safety layer being composed of one or more materials from the group consisting of calcium sulfate, magnesium carbonate, calcium carbonate and barium carbonate and serving to absorb heat by an endothermic reaction to prevent the temperature of said shell from rising above about 1300° C. until said safety layer shall have decomposed endothermically.

References Cited in the file of this patent

UNITED STATES PATENTS

| 1,723,989 | Balduf | Aug. 13, 1929 |
| 2,825,688 | Vernon | Mar. 4, 1958 |
| 2,868,708 | Vernon | Jan. 13, 1959 |
| 2,936,273 | Untermyer | May 10, 1960 |

FOREIGN PATENTS

| 550,274 | Canada | Dec. 17, 1957 |